United States Patent [19]
Hieronymus et al.

[11] Patent Number: 5,978,720
[45] Date of Patent: Nov. 2, 1999

[54] AGRICULTURAL MACHINE, ESPECIALLY COMBINE HARVESTER, WITH MULTI-PROCESSOR GUIDE SYSTEM

[75] Inventors: Peter Hieronymus, Schlob Holte; Norbert Diekhans, Guetersloh; Willie Behnke, Steinhagen, all of Germany

[73] Assignee: Claas oHG, Harsewinkel, Germany

[21] Appl. No.: 08/500,855

[22] PCT Filed: Nov. 26, 1994

[86] PCT No.: PCT/EP94/03912

§ 371 Date: Feb. 22, 1996

§ 102(e) Date: Feb. 22, 1996

[87] PCT Pub. No.: WO95/16225

PCT Pub. Date: Jun. 15, 1995

[30] Foreign Application Priority Data

Dec. 8, 1993 [DE] Germany ............................ 43 41 834

[51] Int. Cl.$^6$ ............................ G06F 11/00; G06F 17/00; A01D 41/00
[52] U.S. Cl. ............................ 701/29; 56/10.2 R; 56/10.8; 340/438; 340/870.03; 340/684; 340/870.16; 345/116; 345/117; 345/145; 345/161; 701/33; 701/50; 702/185
[58] Field of Search ............................ 701/29, 30, 31, 701/32, 33, 34, 36, 49, 50; 56/10.2 R, 10.4, 10.2 C, 10.2 D, 10.2 E, 10.2 F, 10.2 G, 10.2 H, 10.8; 340/462, 679, 684, 438, 457, 457.4, 870.01, 870.02, 870.03, 870.05, 870.07, 870.16; 702/119, 182, 183, 184, 185; 345/115, 116, 117, 133, 140, 145, 146, 161, 168

[56] References Cited

U.S. PATENT DOCUMENTS

| | | |
|---|---|---|
| 4,277,833 | 7/1981 | Steffen ............................ 702/128 |
| 4,376,298 | 3/1983 | Sokol et al. ............................ 701/34 |
| 4,630,191 | 12/1986 | Strosser ............................ 364/186 |
| 4,715,012 | 12/1987 | Mueller, Jr. ............................ 701/50 |
| 4,744,218 | 5/1988 | Edwards et al. ............................ 340/825.06 X |
| 4,811,561 | 3/1989 | Edwards et al. ............................ 340/825.06 X |
| 5,488,817 | 2/1996 | Paquet et al. ............................ 56/10.2 R |

FOREIGN PATENT DOCUMENTS

277606 A1  4/1990  Germany .

OTHER PUBLICATIONS

Landetechnik, Bd. 47, FEb. 1992 De, pp. 71–74, Gottschalk, Klaus 'Fehlerdiagnose An Verteilten Mikrorechnersystemen Fur Mobile Landmaschinen'.

Primary Examiner—William A. Cuchlinski, Jr.
Assistant Examiner—Ed Pipala
Attorney, Agent, or Firm—Browdy and Neimark

[57] ABSTRACT

An agricultural machine, especially a combine harvester and thresher, which consists of component devices (1-N) with associated microprocessors (M1–MN), of which at least one is a control station processor (M1) with a control keypad (TA) and a screen (V), which microprocessors are connected to measurement, actuation members of the respective component devices (1-N) and regarding this, process data that appears in the component device (1-N) in a controlling or regulating manner, or in a manner which displays it, wherein these microprocessors (M1–MN) are connected syndetically to a standard communications bus (B) via conventional interface circuits (SS) and via these circuits, continuously transmit operating data with an identifier, which is specific to the operating data, wherein in the individual microprocessors (M1–MN), the identifiers of these kinds of operating data, which are to be received, are stored in a table as a one in a bit configuration and are accessed with the identifier at the bit positions of the table, and whenever a one is stored there, the identifier with the affiliated operating data transmitted is taken.

28 Claims, 7 Drawing Sheets

Fig. 5

| 14:47:31 | Adjust Slip | BF1 | |
| --- | --- | --- | --- |
| 21.02.92 | BF2 | | |
| Threshing Cylinder | 0.2 % | Motor Speed | 1000 U/min |
| Blower | 0.0 % | Empty Load Speed | 0. U/min |
| Chaff-Cutter | 0.0 % | Nominal Speed | 0 U/min |
| Slope Conveyor | 0.0 % | Waste produced during Operation | 0 % |
| Shaker | 0.0 % | | |
| Elevator | 0.0 % | | BF3 |
| Tailings | 0.0 % | | |
| | BF5 | | |
| Threshing Cylinder | Blower | Chaff-Cutter | Slope Conveyor |
| Shaker | Elevator | Tailings | |
| BF4 | BF8 | BF6 | BF7 |

Fig. 6

AGRICULTURAL MACHINE, ESPECIALLY COMBINE HARVESTER, WITH MULTI-PROCESSOR GUIDE SYSTEM

The invention relates to an agricultural machine, in particular a combine harvester and thresher, which is comprised of component devices with associated microprocessors, of which at least one is a control station processor with a control keypad and a screen, which microprocessors are connected to measurement, actuation, and/or display members of the respective component devices and regarding this, process data which comes up in the component device in a controlling and/or regulating manner, or in a manner which displays it; these microprocessors are connected to one another by a communications bus via conventional interface circuits and via these circuits, in accordance with a protocol, continuously transmit actual operating data which is relevant for each other, such as rpm, speed, time, etc., together with an identifier, which is specific to the operating data.

Gottschalk discloses a device of this kind in his article "Trouble Shooting" in the periodical [Z:] Landtechnik 47, pp. 71-vol. 74, 1992. A plurality of microprocessors are connected to communicate by means of a standard CAN-communications bus and are connected to measuring and actuating members of component devices, namely an engine, running gear, work unit, and a display device, as well as to a diagnostic processor, and process their data for controlling and regulating the subdomain functions, and exchange it on a priority basis and employ it diagnostically.

It is provided that the individual component devices, as needed, are each consulted for actual operating data such as rpm, speed, time, etc. by another respective, relevant component device. The transmission of data is carried out in accordance with a standard protocol, by means of conventional interface circuits, which also furnish a single-lead emergency operation instead of the usual dual-lead operation. In complex agricultural machines, in particular combine harvester and threshers, this type of on-demand data polling from the other component devices requires an extensive expenditure for enciphering and deciphering, which can lead to extended queuing and long message processing times in the processors, and under some circumstances to inadmissible down times of the actuating and regulating devices and to malfunctioning of the same.

Furthermore, DE 37 08 324 A1 discloses a microprocessor-controlled information device of an agricultural machine, which shows wiring data and operating data, which are each specified and determined actually by measurement; the terms displayed are taken from a speech vocabulary memory, which is consulted each time. A specification or selection of operation adjustment data and parts of the operating program is carried out with dialogue support via a numeric keypad and different control keys or buttons. The perception of spoken information during continuous operation demands an increased concentration and attentiveness of the operator, which thus takes away from his observation of the machine and path of travel.

Furthermore, the Philips data sheet 82C200, Preliminary Functional Description, pp. 4–7, discloses a bus interface component, which includes an acceptance filter subassembly, with which the identifiers are compared one after the other, whereupon only the messages whose identifiers correspond to one of the ones stored in memory are transmitted to the affiliated microprocessor. The times for the successively carried out comparisons are relatively high depending on the identifier number, and messages which have arrived in the meantime under some circumstances are not received and are lost, unless a higher-priority software organization sees to it that additional monitoring and rerequesting of the transmission of the same message is carried out. This means further time delays, so that in practical applications of agricultural machine technology, real-time communication was possible only if no more than a very low number of message types was exchanged.

It is the object of the invention to increase the capacity of the agricultural machine mentioned at the beginning, in particular of its master unit, to communicate between the processors and with the operator, while at the same time placing less of a physical demand upon the operator.

The embodiment is comprised in that in the individual microprocessors, by means of the respective identifier received, a key marker field is accessed in which the key markers of such operating data types, which are to be received in the appropriate microprocessor, are stored in memory, and whenever a key marker is found there, the relevant identifier, as well as the transmitted operating data affiliated with it, is received, stored, and processed, and in that in the control station processor, depending on its respective dialogue state, which is achieved according to the program by means of an operation of the control keypad and/or a selector switch with numerous switch positions, the operating data continually received in the control station processor, is transformed into analog pictograms, numeric depictions, and/or textual representations, each depending upon its identifier, and is adjusted by updating in at least one display field of a screen mask, which is associated with the respective dialogue state, is stored and thus a continually updated display or picture memory content is represented on the screen.

In an advantageous embodiment, the novel type of acceptance filtration requires only one memory access to the key marker field, which is laid out as a table in which the key markers of the permissible indicators are stored in memory as bits. If the table has a two-dimensional, byte-based configuration with 2048 bits for memory space reasons, then for an identifier test, an addressing of the table with an eight-bit address length and an access with three bits to a deciphering table for transformation from three-bit to one-out-of-eight is required, as well as a comparison operation of both results. These three operation steps are carried out parallel to further message reception so that after the completion of the message in the receiving buffer, if the buffered message is definitely intended for the microprocessor, it is taken practically without delay, hence in real time, and can be immediately processed.

As a result, it is possible to realize an instrumentation on the processor-controlled screen, with a display of actual operating data. A particular advantage is that the instrumentation depicted is adapted to each type of operation; but a similar basic structure of the display mask always remains, so that the operator has to do as little transforming mental work as possible, and a fixed place association is maintained by the screen for appointed operating states, which aids in safety.

By means of the high transmission capacity, it is also possible to communicate to the operator and insert onto the screen priority alarms and urgent bulletins. Only the actual information, which must be reacted to is in the operator's field of vision; the monitoring of the individual, critical components takes place automatically and is not displayed. The only data depicted on the screen visible in the cab is that which has to be influenced by the operator, depending upon the terrain and crop state. This data is the speed, the direction of travel and with it, the cutting width, the cutting unit height, and cutting unit pitch. All the functions mentioned are controlled in one-handed operation on the control stick, which is equipped with four buttons for cutting unit adjustment. The execution of control takes place by means of set-point value specifications, which are continually transmitted to the appropriate processors. To simplify the cutting unit adjustment, a particular program is provided, which makes possible the immediate selection of stored set-point values and of various regulating programs by means of the control stick buttons, but also achieves a change of the set-point values when necessary.

In an advantageous embodiment, it is provided that apart from or instead of via a menu preselection, set-point value specifications are to be initiated via a selector switch setting; depending on the particular selector switch position, a corresponding part of the operating program produces a transmission connection to the particular unit selected and actuates an appropriate pictogram and numerically represents the increased or decreased set-point value, by means of actuating a ± key, which is preferably the rocker key provided, in a bar region between its permissible limit values.

During the direct set-point value specification, the cursor position and the menu state of the driving and harvesting display are each temporarily stored and upon a reversal in menu mode are preferably activated again and displayed by means of a corresponding adjustment of the selector switch.

The selector switch is preferably a rotary knob, whose middle position is provided for menu navigation and whose other positions are provided for set-point value determinations. These concern the set-point threshing drum rpm, set-point fan rpm, set-point spacing of the concave, set-point sensitivity of the sieve loss sensor, set-point sensitivity of a shaker loss sensor, set-point reel rpm, set-point lower sieve width, set-point upper sieve width, and/or set-point slat elevator rpm.

Each selected set-point value is extracted from the affiliated set-point value memory in the corresponding microprocessor and displayed and, upon specification of a change increment, is changed in the set-point value memory and acknowledged once more. The actual value, which is changed by means of the adjustment to it carried out, is continuously displayed as well so that there is a complete function control. In addition, the monitoring program works continuously, which signals an alarm if the actual value does not agree with the set-point value, or a long triggering or no triggering of the affiliated actuating member ensues. A display, acknowledgment, and storage of alarms takes place as in the menu-driven parts of the operating program.

Advantageous embodiments are recited in the dependent claims, described in detail in the drawing description, and shown in the drawings.

FIG. 1 schematically shows the acceptance filtration;

FIG. 5 shows an adjusting mask;

FIG. 6 shows an adjusting mask for slippage limit value specifications;

Figure 1:
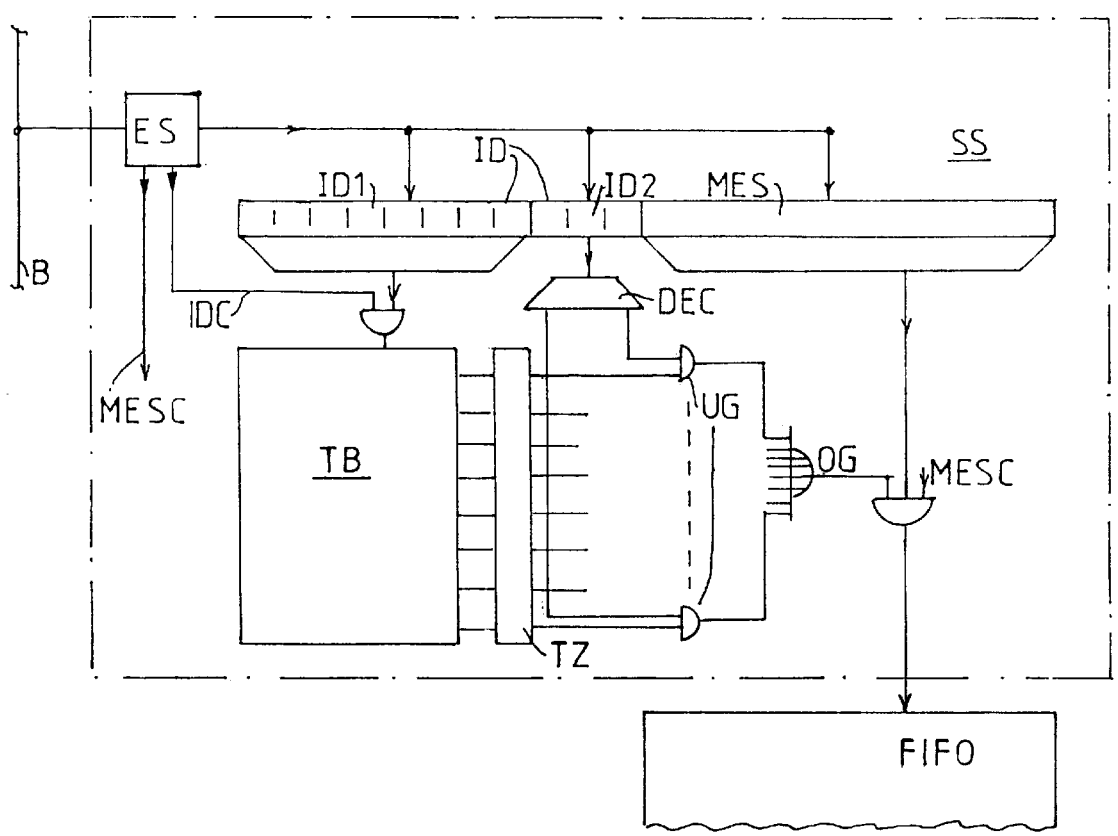

FIG. 1 schematically shows the acceptance filtration of messages (ID, MES), which are received by one of the microprocessors. The message is serially written to a buffer memory by the bus (B) via a receiver circuit (ES), which produces the level conversion and synchronization, which memory is comprised of an identifier section, which receives the identifier (ID), and an operating data section, which receives the operating data (MES). If the receiver circuit (ES) sends an identifier complete signal (IDC), the identifier (ID), with a first, 11-bit identifier section (ID1), addresses the identifier memory (TB), which contains 256 bytes, so that a 1-byte word is present at its output, which word is supplied to an eightfold AND function (UG) to which three bits of a second identifier section (ID2), decoded to one-out-of-eight (a table (DES) can be used for this), are supplied, and whose output signals are combined in an OR function (OG), which, on the output side, controls the transmission of the identifier (ID) and the operating data message (MES) into a temporary storage area (FIFO) of the microprocessor (M1) as soon as the operating data message (MES) is completely received, which signals the receiver circuit (ES) with the message complete signal (MESC).

The functions shown in the form of hardware are preferably embodied to a large extent in accordance with the program in the microprocessor; the complete bulletins (IDC, MESC) serve to synchronize the operation of the buffer memory and the program. The transfer of the buffer content appropriately takes place as in the known interface circuits, each serially and in byte-based configuration, which is not shown in detail.

Figure 2:
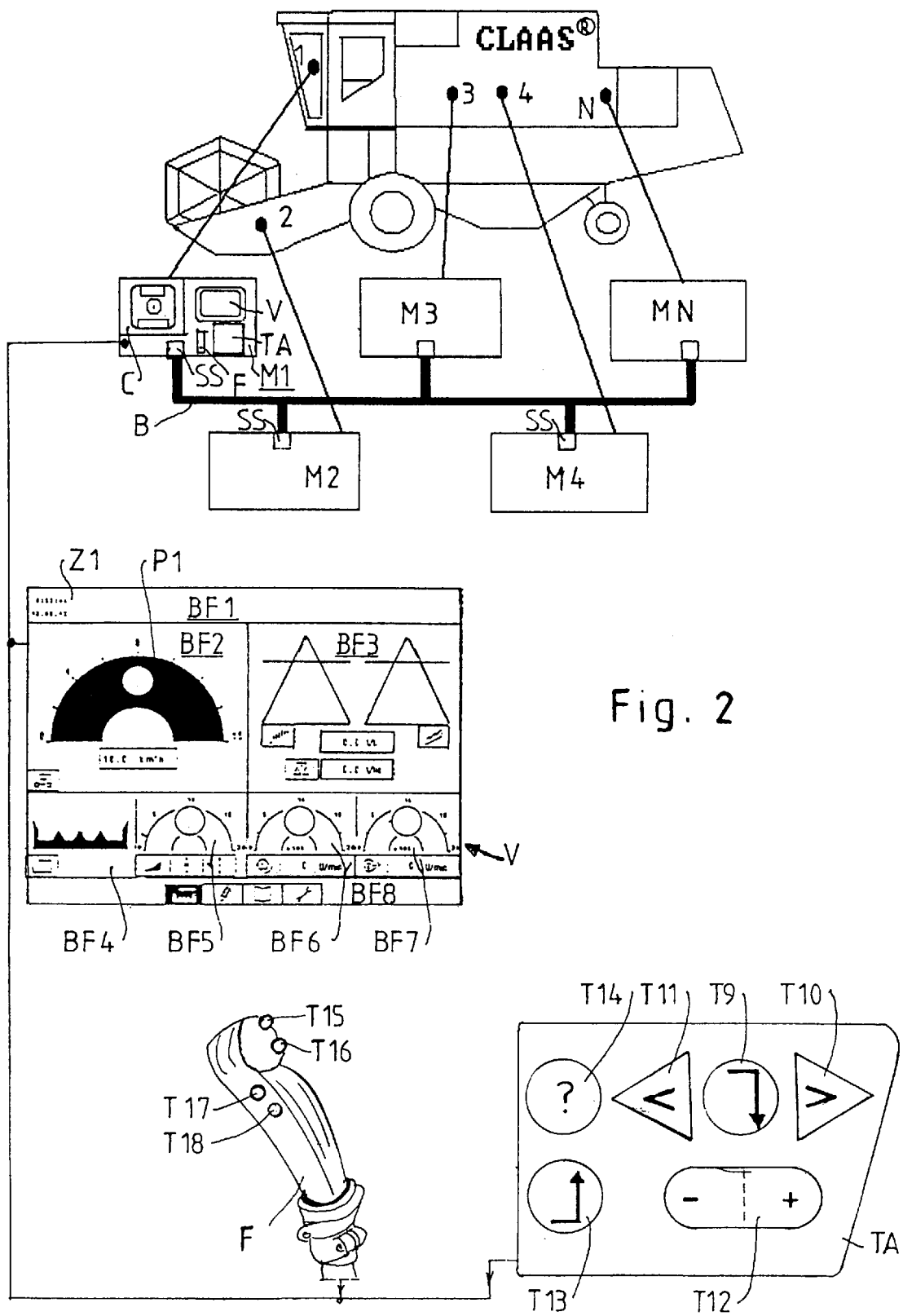
FIG. 2 shows a schematic general plan of a combine harvester and thresher with a multi-processor network and detail enlargements in various scales.

FIG. 2 shows a schematic general plan of a combine harvester and thresher having a microprocessor network with the bus (B). The control station processor (M1) is installed in the cab (1), and a second microprocessor (M2) is installed on the cutting unit (2) for cutting unit control and regulation, a third microprocessor (M3) is installed on the drive and running gear (3), a fourth microprocessor (M4) is installed on the threshing unit (4), a fifth microprocessor (MN) is installed on the feed- and cleaning unit (N), which supervises the flow of material. Each microprocessor (M1–MN) is connected to the central communications bus (B) via an interface circuit (SS). The control station processor (M1) drives the screen (V) and is driven by means of a control keypad (TA) with 7 keys (T9–T14) for screen dialogue operation as well as by means of cutting unit adjusting buttons (T15–T18) disposed ergonomically on the control stick (F).

The screen display areas are the time and date display (BF1), the driving speed display (BF2), the grain loss- and harvesting capacity display (BF3), the work width (partial width) display (BF4), the cutting height setting unit scale with the display of cutting height set-point values (BF5), the threshing drum rpm display (BF6), the fan rpm display (BF7), and the selection bar of the main menu (BF8). The key functions from the key field (TA) are the confirmation key (T9) for opening menus, for confirming the adjusting unit, and for starting and stopping tasks, the cursor key "Right" (T10), the cursor key "Left" (T11) for selecting menu items; using "Left", one can navigate from the first menu item to the last item and vice versa; the ± rocker key (T12) for adjusting values, the escape key (T13) for jumping back to the next higher menu level, and the help key (T14) for calling up explanatory text about the actual menu item. Further pressing of this help key leads back to the menu item. If the key is kept pressed longer, then the key function automatically repeats multiple times. On the control stick (F), there are the cutting unit lifter pushbutton (T15), pushbutton (T16) for lowering the cutting unit, pushbutton (T17) for turning on the automatic cutting height preselect system, and pushbutton (T18) for turning on the automatic contouring system.

The eight display or picture fields (BF1–BF8) are disposed on the screen (V), in which pictograms (P1) for analog depiction of operating data, numeric data (Z1) for numerical data output, and in other operating states, textual data are shown.

The display areas for time display (BF1) and for menu selection display (BF8) are always present in the same way, wherein the time and date are shown, continually updated by the electronic internal clock and the menu display is effected as a function of the key actuation of the control keypad (TA), by depicting the main menu display symbols in solid form if updated and otherwise in transparent form.

In the other display fields (BF2–BF7), various operating information appropriate to each menu item are shown. The starting point is always the driving display, FIG. 3, in which a tachometer is shown in the large display field on the left (BF2) and an operational load indicator is shown in the large display field on the right (BF3).

Using a first key selection, this menu item can be changed to a harvesting display, FIG. 4, where once again the tachometer is shown on the left and where in the large display field on the right (BF3), the grain loss rate and the harvesting capacity are continually shown in two triangular pictograms. The respective working width, cutting unit height selection, threshing drum rpm, fan rpm, and engine rpm with the engine load are shown and numbered in the small display fields (BF4–BF7) beneath the triangular pictograms.

From the driving display (FIG. 3) and the harvesting display (FIG. 4), one navigates hierarchically in submenus by means of further actuations of the keys, primarily as follows:

Main Menus

| Driving Display | Harvesting Display |
|---|---|
| harvesting display | partial width on/off |
| adjusting | adjusting |
| registering | registering |
| instructions for use | instructions for use |
| service | service submenus |
| Adjust | Instructions for Use |
| adjust quantimeter | basic adjustment |
| adjust cutting unit | adjusting help |
| adjust rpm monitor | problems and solutions |
| adjust system data | system data |
| Record | Service |
| record machine data | machine service |
| record memory data | checklist |
| record task data | safety tips |

The submenus are subdivided further, as shown below in the table for adjusting:
Adjust
  Adjust System Data
  adjust rpm display
  adjust language
  adjust date and time
  select combine harvester and thresher type
  Adjust On-Board Information Unit
  cutting unit width
  working position
  calibration travel distance factor
  direct adjustment distance factor
  storing the actual adjustment distance factor
  Adjust RPM Monitor
  adjust rpm
  adjust permissible operational waste
  adjust additional slippage
  Adjust Contour
  adjust end stops
  adjust key/spring ratio
  adjust the number of set-point values
  adjust set-point values
  Adjust Quantimeter
  correction account of throughput factor
  suggestion list of throughput factor
  store current adjustment of the throughput factor.

Figure 5:
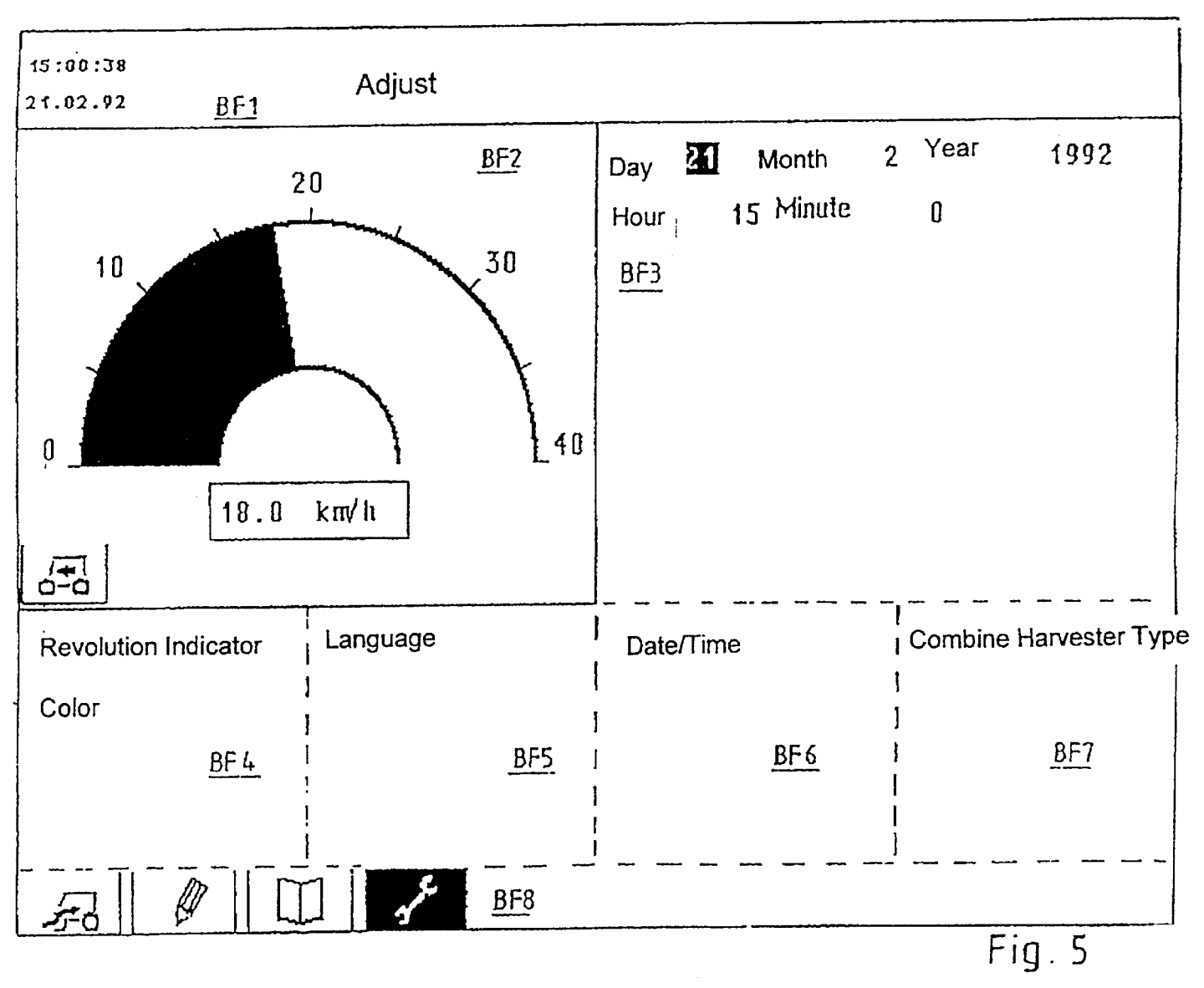

The display layout is shown by way of example in FIG. 5, in the menu item "adjust system data, date and time". The menu item is highlighted in negative typeface in the sixth display field (BF6) and the date, which has just been adjusted, is indicated with the highlighted key word "Day" in the third display field (BF3).

In addition to the depictions of normal operating data, overriding alarms and important bulletins are shown in the display fields (BF2–BF7), which are to be variably assigned.

Alarms are a particular form of higher priority bulletins. They produce an optical and acoustic signal, which must be acknowledged by the operator. The optical signal is comprised of a symbol and explanatory text and overlaps the previous screen content. After an acknowledgement, the alarm appears only as a bulletin.

The following alarms are defined:
RPM monitoring; the slippage exceeds a specified threshold value in:
  threshing drum—fan—shaker
  slat elevator—tailings elevator—chopper.
Alarm bulletins of on-line diagnosis are:
  hardware module defect—sensor system module defect—actor system module defect Bulletins are depicted as an optical symbol in the fourth to the seventh display field (BF4–BF7). Each bulletin symbol is displayed in a fixed position. In addition, a short beep is given.

The following bulletins are defined:
  Service necessary (after 10 hours, 50 hours, 100 hours, 500 hours)
  Chopper ON
  Auto-contour status
  Undervoltage
  Overvoltage.

In order to achieve a rapid and simple priority control of the information exchanged on the communications bus, the identifiers are assigned to designated classes with three of their bit positions, as is shown in the table below. By means of a simple testing of these positions, the priority is determined as a function of the receipt of a message as a result of a positive acceptance test result and as a function of this priority, the affiliated message is used or placed in a queue. Thus it is assured that critical alarms can be communicated immediately.

| Priority levels: | bin |
|---|---|
| System messages | 000 |
| Alarms | 001 |
| Set-point values | 010 |

-continued

| Priority levels: | bin |
|---|---|
| Actual values | 011 |
| Bulletins | 110 |
| Diagnosis | 111 |

Some alarm bulletins are compiled in the table below:
Message Data Area
Alarm
  On-Board Information Unit
  threshing drum
  fan
  on-line diagnosis:
  (actor system/sensor system)
  cutting unit ON (switch)
  RPM change (switch)
  fan RPM
  speed
  engine RPM
  threshing drum RPM
Alarm
  RPM gauge
  shaker
  slat elevator
  tailings elevator
  grain elevator
  chopper
  on-line diagnosis:
  (actor system/sensor system)
  shaker rpm
  slat elevator rpm
  tailings elevator rpm
  grain elevator rpm
  chopper rpm
Alarm
  Contour
  2 byte Int.
  on-line diagnosis
  (actor system/sensor system)
  automatic lowering machine ON (key)
  magnet valve right
  magnet valve left
  magnet valve down
  magnet valve up
  contour ON (switch)
  cutting height regulator ON (key)
  actual value position
  actual value right
  actual value left
  actual value, spring
  set-point value of cutting height regulator
  set-point value of automatic lowering machine
  cutting unit switched OFF.

The rpm monitoring is carried out when the cutting unit is lowered and switched on and a minimal working rpm of the engine is achieved. Then the rpm of the individual, V-belt driven shafts in relation to the engine rpm is evaluated relative to the idling rpm ratio and tested to see whether a preset slippage has been exceeded. In the narrower sense, it consequently concerns a slippage monitoring. If the permissible slippage is exceeded, the appropriate alarm is signaled and displayed with the highest priority. After the acknowledgment of the alarm by means of a corresponding actuation of the confirmation key (T9), the bulletin remains in the display field, but the further generation of alarm bulletins and a continuous overloading of the communications path is prevented by the fact that the slippage tolerance limit is incrementally increased, while a corresponding increment adjust bulletin is given to the affiliated monitoring processor (M4) and evaluated by it. In addition, a corresponding bulletin is entered in a maintenance and repair instruction memory; this bulletin is deleted after the maintenance has been carried out in the maintenance mode, and the permissible slippage is also specified once again. The screen division which occurs in this connection for the menu item of the slippage specification for the threshing drum is shown in FIG. 6.

To synchronize the individual rpm measurements with the engine rpm, the latter is transmitted periodically to the other stations, functionally, every second.

Furthermore, the driving speed and the on-off state of the cutting unit are transmitted at short time intervals.

Moreover, the following messages are periodically exchanged by the control station processor (M1) with the drive and running gear microprocessor (M3):
Receiving:
  partial width 1/1–1/4—working width
  static radius×traverse
  upper engine idling rpm—full-load engine rpm
  Minimum working rpm—permissible slippage
Sent:
  cultivated area—area yield—distance
  work hours—operation hours—on-board network voltage
  engine load—fan rpm
  threshing drum rpm.

The latter data is used in particular for the output of harvesting and accounting information as well as for the setting up of a harvesting cadastre for the correlation of grain throughput data, which is determined and periodically sent out by the feed- and cleaning microprocessor (MN), and stored for continuous and accumulated output.

Continuous communication with short reaction times also takes place in particular between the control station microprocessor (M1) and the cutting unit regulator processor (M2), since the signals of the command buttons (T15–T18) on the control stick (F) must immediately be translated into control actions for setting the height and pitch of the cutting unit, since these are used for the optimal detection of grain of varying heights and/or grain which is at an angle or lying flat and for the prevention of damage to the cutting unit by stones or clumps of soil and, for prevention of an overloading of the feeder, for the respectively specified driving speed and cutting width, which are determined by the longitudinal or lateral pitch adjustment on the control stick (F).

In particular, the following periodic messages are provided for communications on the part of the cutting unit processor (M2):
Reception:
  driving speed
  incrementation or decrementation of the cutting height,
  set-point values for the two automatic lowering machines
  set-point value for the cutting height regulator Transmission:
   actual value of the automatic lowering machines
   actual value of the right and left ground feeler
   automatic contour system on-off
   adjusting magnitudes of the automatic lowering machines on-off
   adjusting magnitudes of the cutting height regulator on-off Furthermore, alarms are sent with priority, which signal the exceeding of specified actual value limit values as well as malfunctions of the actuating members, the magnet valves of the hydraulic height and pitch adjusting devices.

The actual values are constituted of bearing pressure (measured at the cutting unit spring) and the ground clearance (measured via feeler). Hence the driver has the capability of smoothly adjusting the bearing pressure and the ground clearance of the cutting unit.

In addition to the height regulation, a lateral regulation is also active so that the cutting unit is guided parallel to the ground and the cutting height is constant over the entire width of the cutting unit. This lateral regulation compares the left and right ground clearance and when there are discrepancies, gives correction signals to the hydraulic system.

With the automatic lowering machine, the driver has the possibility of preselecting a cutting unit height of over 100 mm, for example. The preselected height is automatically set. During travel, the driver can switch back and forth between the automatic lowering machine program and the cutting height regulator program and can thus set different cutting unit heights at the push of a button. These function change-overs are mainly controlled via the buttons on the multi-function handle (F) of the control stick. The upper button (T17) is used to lift the cutting unit up from the automatic contour position range near the ground and into the cutting height range farther from the ground. The lower button (T18) is used to lower the cutting unit into the automatic contour adjustment, which can either be on the order of a specified cutting height preselection, or a specified cutting height regulation. This is decided only when an associated set-point value is adopted.

Two types of set-point value inputs are provided. In the first method, the set-point value can be changed by means of the ± key (T12) of the keypad (TA). This changing of the set-point value can be adjusted in the work menu. The system supports the input in that the cursor is in the position corresponding to the automatic system that has been preselected by the driver with the button on the multi-function handle (F). The set-point value is incrementally adjusted by small increment widths (2.5%). The execution time is under one second. The terminal sends with it the message "increment" or "decrement" to the cutting unit microprocessor (M2), which in turn answers with the new set-point value. The calculation of the new set-point value is thus carried out centrally in one location. Presetting of the set-point values (S11, S12; S21, S22), FIG. 4, is also possible in the Adjust Contour submenu.

The second method makes it possible for the driver to adopt the actual value as the new set-point value. To that end, the cutting unit is brought into the set position via the raising and lowering buttons (T15, T16), and then, by pressing the corresponding automatic-system button (T17, T18) for a long time (over 3 seconds), the actual value is adopted as the new set-point value. A short actuation of the switch, however, lowers the cutting unit into the automatic position, which is determined by the other set-point value, and the established set-point value is not changed. The decision whether the old set-point value should be retained afterward or the actual value should be adopted as the new set-point value is made only after the release of the switch.

Figure 4:
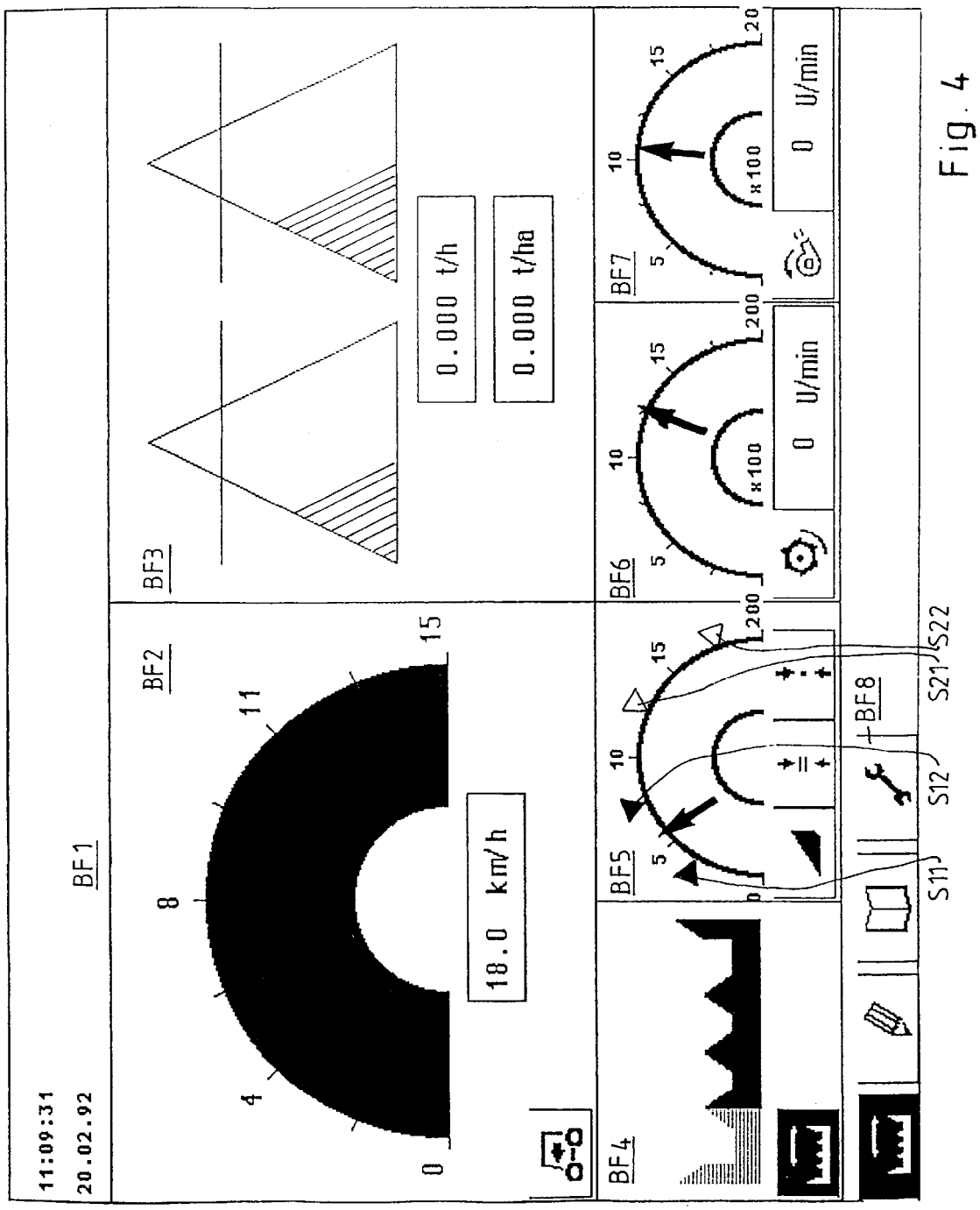
FIG. 4 shows a harvesting display mask.

The possibility is offered to the operator to reserve two set-point values (S11–S22), FIG. 4, display field (BF5), for each of the two regulation ranges. The driver can select via the Adjust Contour menu whether he will work with one or two set-point values. If two set-point values are stored, then one can change between them at the push of a button. This is advantageous when the grain is partially standing and partially prone, or is sharply sloped. The setting of one set-point value (S11, S21) is provided when the system is switched on. If two set-point values are selected, then the two set-point values (S11, S12; S21, S22) are also displayed, which at the beginning are disposed apart from each other by a standard difference.

Actuating one of the automatic buttons (T15–T18) switches back and forth between the different set-point values. If the corresponding automatic system was switched off, the old set-point value is taken as the first initial value. If there is massive ground contact of the cutting unit, and one of the feelers is deflected by at least 85%, an automatic emergency lifting takes place, e.g. an overriding of the stored set-point values, and an alarm is issued.

As with the cutting height regulator, the so-called contour regulator functions as a lateral pitch regulator with the corresponding set-point values and ground contact sensing informer so that parallel guidance of the cutting unit close to the ground remains guaranteed. The lateral regulation is practically always switched active. Its regulation precision (dead zone) comes to 6% when the cutting unit feeler is deflected only slightly, in which case the actual value lies in the upper third, and comes to 15% when the feeler is deflected greatly. If the set-point/actual deviation is greater than 20%, then the corresponding magnet valves are switched on at a 100% duty cycle. If the set-point/actual deviation is less than 20% and greater than 5%, then the corresponding magnet valves are pulsed at a 10% duty cycle, in an approximately one-second rhythm. When the deviation is less than 5%, the magnet valves are switched off. To increase the sensitivity of the set-point value preselection, the corresponding magnet valve is compensatingly actuated immediately after a set-point value adjustment already at a set-point/actual deviation of 2.5%.

Hence, as for the cutting unit regulation, standard adjustment values are specified, e.g. set-point and limit values, from which the operator can specify a change when there are operating conditions which diverge from the norm, this is therefore also the case for the other subassemblies of the combine harvester and thresher. Standard values of weight per liter at an average quality and average moisture for individual types of grain are stored for yield and loss measurement, which is why after switching on, the menu-driven selection of the type of grain must be carried out. At time intervals, moreover, externally determined weight per liter data can be input if there is no automatic weighing system. The data is transmitted into the yield and loss measuring microprocessor (MN) and is used there for the evaluation of measurement data, whereupon the results are continuously transmitted to the control station microprocessor (M1) and are entered there for the continuous output in the harvesting display in the pictogram of the display field (BF3) and are stored temporarily for evaluation and later output to a printer or a cassette (C). The grain loss measuring device also requires the input of the grain type for the sake of correlation of the signals measured; characteristic values are assigned to each grain type and are kept stored in memory.

If a loss value occurs that exceeds a specified limit value despite the regulation conditional optimizations, an alarm bulletin is given. By means of the conspicuous, very clear depiction of shaker loss in the left triangle and sieve loss in the right triangle of the display field (BF3) of the harvesting display mask, FIG. 4, the operator constantly has these important operating criteria in his field of vision so that he can continuously carry out a further optimizing by means of the respective suitable cutting width choice, driving speed adjustment, cutting height adjustment, and optionally sieve and fan adjustments.

The ergonomic disposition of the control stick (F) in grasping region of the right hand and that of the keypad (TA) in front of the right hand also allows an easy access during continuous operation to the stored information and the respecification of operational set-point values.

In the control station processor (M1), the processing of the incoming messages into the individual display fields takes place on two different program planes. An arriving message is first handled in an interrupt-controlled background program plane as follows:

If there is an alarm according to the identifier, the affiliated message is taken out of the buffer and an alarm marker is placed, and the message supply to the affiliated alarm display field (BF3) is decided on and noted in a display field memory, the beep is switched on, and the identifier is deleted as well.

If there is no alarm, but rather a bulletin, the bulletin which corresponds to the message is noted in a control field of the bulletin display field area (BF4) and a short beep is initialized and the identifier is deleted as well.

If there is neither an alarm nor a bulletin, and if a new display value has been presented, then the display variable is entered in the display field control memory affiliated with the respective display value and the identifier is deleted as well.

The processing of the display field control memory information takes place periodically in a background utility. In this, the individual display area contents are combined in a display memory and/or updated, depending upon the status information in the display field control memories.

Figure 3:
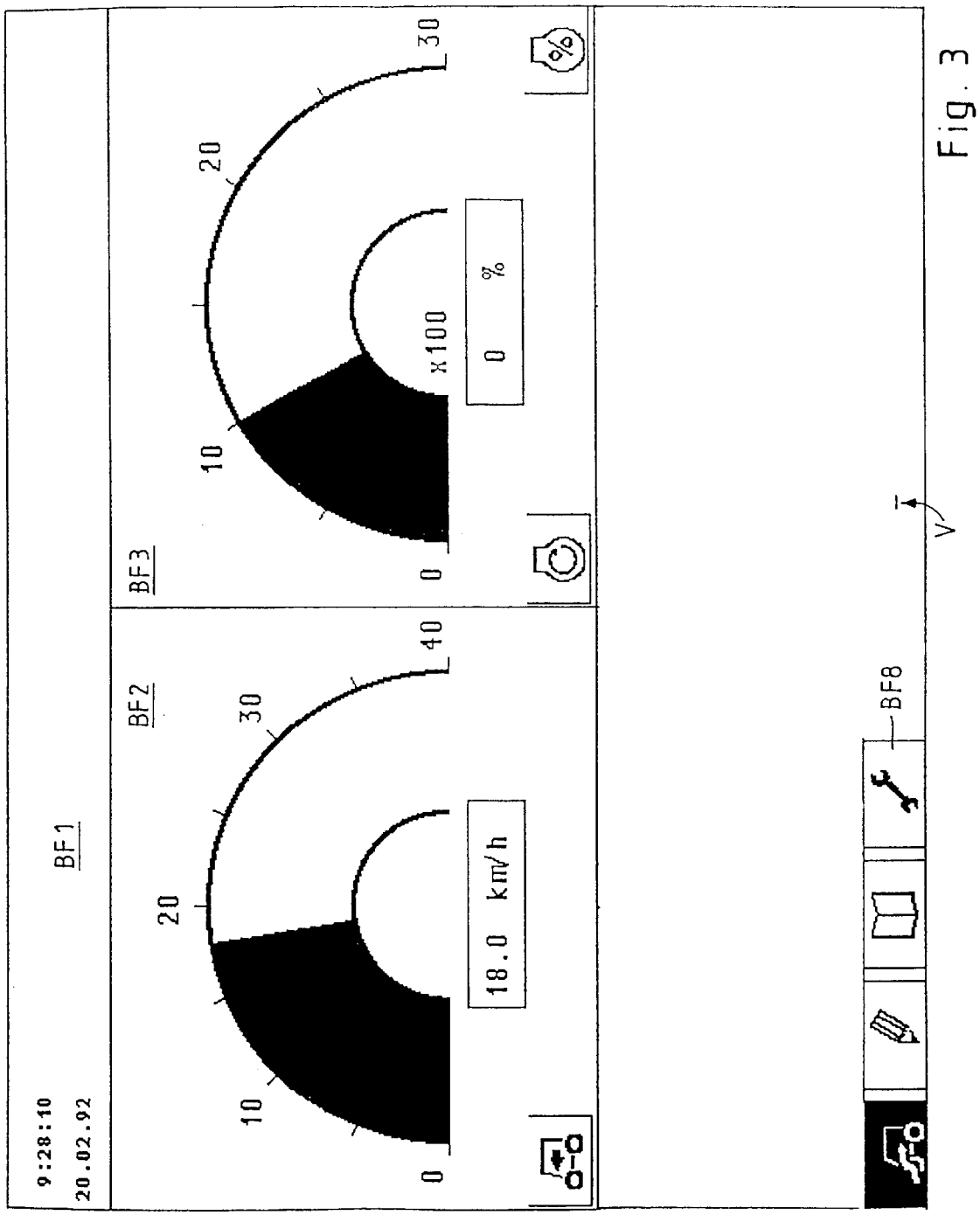
FIG. 3 shows a driving display mask.

If there is a change to the status of threshing unit-on, the harvesting display, FIG. 4, is supplied; if the new status is threshing unit-off, then the driving display, FIG. 3, is constructed.

If a state of the operating keys (T11–T18) is changed, the menu status memory is correspondingly updated and the affiliated display field status memories are provided with corresponding entries, or these memories are erased.

If an alarm has been confirmed by means of actuating a key, the alarm status of the alarm display field (BF3) is deleted in the affiliated display field status area and the beep is switched off.

After that, the new entries contained in the individual display field status memories are hierarchically evaluated on an overriding basis in comparison to alarm entries, bulletin entries, and general operating information, like new actual and set-point values and menu status changes, to control the changing of the display memory contents so that the display content is fully updated.

Figure 7:
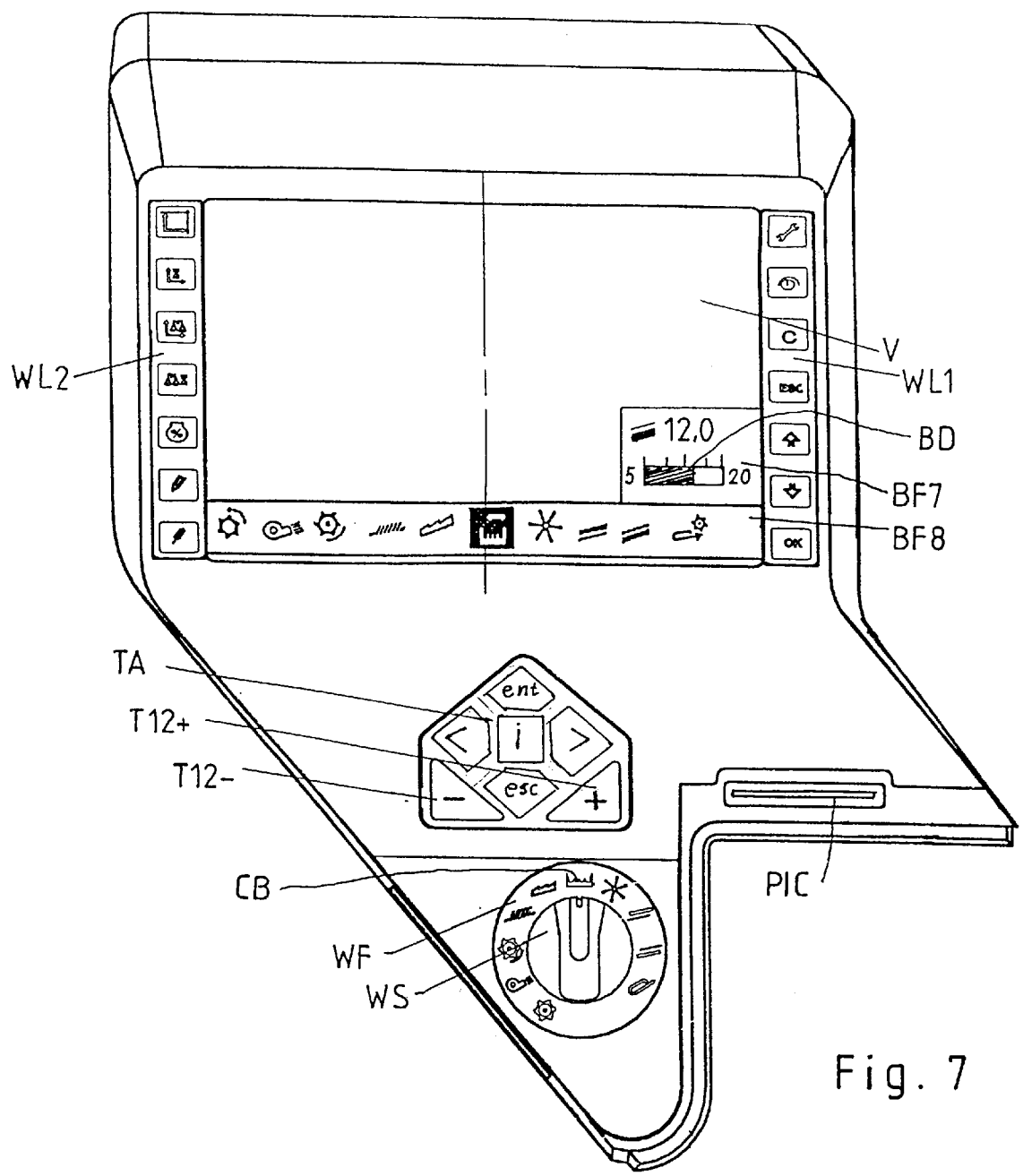
FIG. 7 shows a screen with operating switches.

FIG. 7 shows a screen (V) with a pictogram bar, which is preferably laid out in the lower display field area (BF8), and activated when the selector switch (WS), which as a rotary knob, is disposed next to the keypad (TA) is brought into a specified set-point value position. The middle position (CB) of the selector switch (WS) is for the selection of the normal driving display or harvesting display operation with the menu selection. The individual pictograms concern the selection of set-point value specification to be established: set-point threshing drum rpm, set-point fan rpm, set-point spacing of the concave, set-point sensitivity of each sieve loss sensor, set-point sensitivity of a shaker loss sensor, set-point reel rpm, set-point lower sieve width, set-point upper sieve width, and/or set-point slat elevator rpm. The symbols are also disposed on the selector switch (WS) as the selection field (WF). The rpm set-point values act upon the actuating means of the variable gearing of the V-belt drive. The sieve width set-point values act upon the sieve width actuating means. The sensitivity set-point values influence the degrees of amplification and/or the threshold specifications of the measuring amplifiers of the loss sensors.

The actual value fed back by the actuating means mentioned or the set-point value contained in the selected set-point value memory is numerically displayed in a further partial display field (BF7) and is also shown as a bar graph (BD) between the two limits of the set-point values. In addition, the limit values are indicated on the ends of the bar fields and the bar field (BD) has a scale.

In addition, the symbol of the triggered actuating member is shown in the partial display field (BF7)—here, in the display for one case in which the lower sieve width would be selected. It is provided that in the case of overriding of the actuating means, the affiliated pictogram is highlighted, i.e., shown in a negative typeface.

In this connection, alarm bulletins which appear are dealt with in menu operation and displayed.

The use of the selector switch (WS) gives the operator who is unfamiliar with menu control the simple possibility of being able to carry out the set-point value specifications and actual value assessments and therewith the function influencing and monitoring in a manner entirely similar to how it is done in a traditional combine harvester and thresher.

In a further embodiment of the operating device, the keypad (TA) is only equipped with the two rocker keys (T12+, T12−), and two selection bars (WL1, WL2) are provided with selector keys for menu selection, which keys are provided with pictograms for main menu selection and for indexing and switching back and forth. Preferably the two selection bars (WL1, WL2) are disposed on both sides of the screen. Instead of a rotary knob, a button bar can also be provided as the selector switch (WS), parallel to the pictogram field (BF8).

An input device for a personal identification card (PIC) is disposed on the operating device as a security device.

We claim:

1. In an agricultural machine including:
   a control station processor;
   a control input device coupled to the control station processor;
   a display screen driven by the control station processor;
   a plurality of component devices outputting raw data for measurement, actuation, or display, each component device being coupled to a respective microprocessor, to process the raw data from the component device into actual operating data of a corresponding operating data type;
   a communications bus coupled to the control station processor and connected syndetically via interface circuits to the microprocessors;
   the interface circuits continually transmitting onto the bus, according to a protocol, the operating data and a respective identifier specific to the operating data thereof;

the improvement wherein:

each of the microprocessors includes a respective access key marker field, accessed from the bus by the identifier, wherein are stored access key markers corresponding respectively to the operating data types, such that, whenever an access key marker corresponding to one operating data type is in the access key marker field of one of the microprocessors, that one of the microprocessors receives, stores, and processes the transmitted operating data labeled by the identifier; wherein the control station processor includes a pre-selected dialogue state which is activated by operation of the control input device; and wherein depending on the dialogue state, operating data continually received in the control station processor, depending respectively on the identifier thereof, is
(1) transformed into analog pictograms, numeric depictions or textual depictions,
(2) respectively adjusted for updating and
(3) stored in at least one display field of a screen mask, which is associated with the respective pre-selected dialogue state;

whereby a continually updated display memory content is depicted on the screen.

2. The agricultural machine according to claim 1, wherein the input device is a keypad.

3. The agricultural machine according to claim 1, wherein the input device is a multi-position switch.

4. The agricultural machine according to claim 1, wherein the key marker field comprises a two-dimensional table in which the key markers of the operating data types to be received are stored with value binary one, and wherein the table is respectively addressed with a first identifier section of the identifier and a remaining second identifier section;

the second identifier section, binarily enciphered with a read-out table line content, is AND-combined to the correct place in bit-type configuration, and whenever a coincidence has been determined, the identifier and the transmitted operational data affiliated therewith is accepted, stored, and processed.

5. The agricultural machine according to claim 1, wherein the first identifier section includes eight bits and the second identifier section includes three bits, and the table contains 256 addressable 8-bit words, and wherein the individual bit positions occupied with a binary one each represent one of the operating key markers of a relevant operating message type to be received.

6. The agricultural machine according to claim 1, wherein the identifier includes a section of 3 bits having binary values are associated with various processing priorities of the affiliated messages and serve as program control criteria for priority handling.

7. The agricultural machine according to claim 1, wherein the control station processor drives the screen via a display memory a screen content of which is divided into screen areas which are menu-driven by the input device and are periodically loaded with selected operating data, supplied as pictograms, numerical data, or textual data.

8. The agricultural machine according to claim 7, wherein the screen areas number eight, and wherein a first screen area always shows the current time and date, an eighth screen includes a main menu bar of pictograms, an activated main menu pictogram of which is embodied in solid form, a second screen and a third screen include largest screen areas and, when a threshing unit is switched on in a driving state and in a harvesting state, the second screen continuously displays a driving speed numerically and as a pictogram, and the third screen when in the driving state displays the engine load, shown numerically and as a pictogram, and when in the harvesting state optionally shows a shaker loss display pictogram and a sieve loss pictogram, and a remaining four smaller display fields display operating data of a cutting unit, combine harvester and thresher.

9. The agricultural machine according to claim 8, wherein in each of the four smaller display fields a selected working width is symbolized in bar graph form, actual cutting heights with up to four selectable, actually adjusted set point values of the cutting height are shown in a semicircular scale and specified and actual rpm of a threshing drum and fan are shown.

10. The agricultural machine according to claim 1, wherein whenever the control station processor has received an alarm indicator, a part of a display, number, or text which corresponds to a kind of the alarm message, is overridingly entered into an associated one of the display areas, an alarm indicator is deleted, and an acoustic alarm signal is switched on until a confirmation key is actuated, whereupon a bulletin indicator is emplaced and the alarm message is removed from the display area.

11. The agricultural machine according to claim 10, wherein whenever there is no alarm, but there is a bulletin indicator of an overriding bulletin in the control station processor, then by means of a message reception, or after an alarm deletion, the part of a display, number, or text, which corresponds to the kind of bulletin, is overridingly entered into an associated one of the display areas, the bulletin indicator is deleted, and a short, acoustic signal is given.

12. The agricultural machine according to claim 11, wherein whenever there is neither an alarm nor a bulletin indicator, but there is a general message, which is to be associated with the respective types of pictogram or numeric data entered, the message content is entered in an updated form.

13. The agricultural machine according to claim 2, wherein the keypad comprises means for menu control and includes seven keys further including an actuation key, two cursor keys, a help key, an escape key, and a rocker key, for increasing and reducing respective values selected according to the menu; wherein key actuations of the seven keys are construed as a function of the display content of the display fields, and the values shown there are stored as the operating data and are sent out to the microprocessors provided with corresponding indicators.

14. The agricultural machine according to claim 1, wherein four operating buttons are disposed for gripping by fingers of a driver on a handle of a control stick, a respective first inclination of the stick controlling a speed of the agricultural machine and a respective second inclination of the stick steering the agricultural machine.

15. The agricultural machine according to claim 14, wherein the control stick and the keypad are disposed in a grasping region right hand of the driver, the keypad being disposed thereon for gripping, adjoining the screen on a side thereof.

16. The agricultural machine according to claim 14, wherein the operating buttons include a cutting unit raising button, a cutting height selection button to lower the cutting unit to a selected cutting height, and an automatic contour system selection button;

actuating signals from the cutting height selection button or the automatic contour system selection button being evaluated such that upon a short actuation thereof a higher or lower stored set-point value of a cutting unit height adjusting device is specified and upon a longer actuation a set-point value is specified and, further, an automatic pitch regulating system is switched off or on by corresponding messages transmitted to a cutting unit microprocessor which includes corresponding regulating programs, cutting unit adjusting means, sensor means, and adjusting means.

17. The agricultural machine according to claim 18, wherein whenever an actuation of the cutting unit raising button, the cutting height selection button, or the automatic contour system selection button has lasted longer than a specified minimum time, a respective set-point value activated in the cutting unit microprocessor is continuously incremented of decremented in accordance with the respective key by means of corresponding messages, whereby, a cutting unit height adjustment takes place and an actual state is constantly determined and transmitted back to the control station processor, is displayed on the screen, and is assigned as a new set-point value when the respective key is released.

18. The agricultural machine according to claim 3, wherein the multi-position switch adjoins the control station processor on an input side thereof, and, periodically controlled by an operating program of the control station processor, respective switch positions thereof are taken over by the control station processor; wherein parts of the operating program, which are associated with the respective positions of the multi-position switch, are triggered by the control station processor, wherein in one position of the multi-position switch, the control station processor prepares a menu operation in a harvesting or driving state and in other positions of the multi-position switch the control station processor adjusts a set-point value of an affiliated adjustable unit, which is raised or lowered respectively by means of alternative actuations of a rocker key, wherein a set-point value display is overridingly carried out in one of the display fields and wherein the switch position is displayed in a pictogram field on one of the pictogram bars, which represent the various switch positions and which are disposed in one of the display fields on the screen.

19. The agricultural machine according to claim 18, wherein as a result of each set-point value change, a function monitoring of an affiliated actuating means is carried out and an override thereof produces and stores an alarm bulletin on an associated display field.

20. The agricultural machine according to claim 18, wherein in an adjusted state a particular established set-point value is symbolized in a bar graph and numerically represented in an affiliated one of the display fields, and the bar graph includes a range between respective permissible upper and lower limit values of the set-point value.

21. The agricultural machine defined by claim 20, wherein in the adjusted state is a pictogram and is associated with a respective actuating member to be adjusted as a function of the set-point value, the adjusted state is entered in the affiliated display field, and the pictogram is represented normally when there is an override and otherwise is represented in an inverted depiction.

22. The agricultural machine according to claim 18, wherein in the harvesting or driving state, upon a transition in one of the adjusting states, the respective cursor position remains stored in memory and upon a return to the harvesting or driving state, the cursor position is produced again, displayed, and evaluated.

23. The agricultural machine according to claim 18, wherein set-point state specifications to be adjusted with the multi-position switch include at least one of set-point threshing drum rpm, set-point fan rpm, set-point spacing of the concave, set-point sensitivity of each sieve loss sensor, set-point reel rpm, set-point lower sieve width, set-point upper sieve width, or set-point slat elevator rpm.

24. The agricultural machine according to claim 1, wherein an rpm-monitoring microprocessor monitors rpm by continuously receiving an engine rpm as well as the rpm values of V-belt driven units, threshing drum, fan, chopper, slat elevator, shaker, elevator, and tailings elevator from affiliated sensors and compares rpm ratios thereof to the engine rpm via menu-driven, learned rpm ratios, which are determined as a function of a drive, and when a specified slippage tolerance limit is exceeded, transmits an alarm to the control station processor for output therefrom, which, after an acknowledgment of the alarm, sends out a message to the rpm monitoring microprocessor to increase the slippage tolerance limit, and stores a corresponding maintenance bulletin, which is output later in a menu-driven manner.

25. The agricultural machine according to claim 1, wherein calibration values, compensation values, and limit values, which are associated with the various types of grain and are reserved for normal conditions, are transmitted in a menu-driven manner to a yield and loss measuring microprocessor by the control station processor, can be displayed by the operator in a menu-driven manner and can then be changed or specified once more, and these transmitted values are used for evaluating the loss and harvesting capacity measurement values, and wherein the results are transmitted to the control station processor where they are entered, pictorially supplied in the harvesting display field and are stored for later output to a data carrier or printer.

26. The agricultural machine according to claim 25, wherein the results are output as a harvesting cadastre.

27. The agricultural machine according to claim 1, wherein the machine comprises a combine harvester.

28. The agricultural machine according to claim 1, wherein the machine comprises a thresher.

* * * * *